US008626362B2

(12) United States Patent
Freissinet

(10) Patent No.: US 8,626,362 B2
(45) Date of Patent: Jan. 7, 2014

(54) METHOD AND DEVICE FOR MONITORING THE SPEED OF AN AIRCRAFT

(75) Inventor: Sebastien Freissinet, Toulouse (FR)

(73) Assignee: Airbus, Blagnac (FR)

( * ) Notice: Subject to any disclaimer, the term of this patent is extended or adjusted under 35 U.S.C. 154(b) by 441 days.

(21) Appl. No.: 12/523,326

(22) PCT Filed: Jan. 18, 2008

(86) PCT No.: PCT/FR2008/000067
§ 371 (c)(1),
(2), (4) Date: Jul. 16, 2009

(87) PCT Pub. No.: WO2008/107552
PCT Pub. Date: Sep. 12, 2008

(65) Prior Publication Data
US 2009/0299554 A1    Dec. 3, 2009

(30) Foreign Application Priority Data
Jan. 19, 2007  (FR) ...................................... 07 00359

(51) Int. Cl.
*G06G 7/70*    (2006.01)
*G06F 19/00*   (2011.01)
*G01P 5/00*    (2006.01)
*G08B 23/00*   (2006.01)

(52) U.S. Cl.
USPC .............. 701/14; 701/3; 701/7; 701/8; 701/9; 244/75.1; 244/76 R

(58) Field of Classification Search
USPC .................. 701/3, 7, 8, 9, 14; 244/75.1, 76 R
See application file for complete search history.

(56) References Cited

U.S. PATENT DOCUMENTS

| 4,229,725 A * | 10/1980 | Reilly ........................... 340/968 |
| 4,281,383 A * | 7/1981 | Lebrun ........................... 701/16 |
| 4,664,340 A * | 5/1987 | Jackson ..................... 244/76 R |
| 5,001,476 A * | 3/1991 | Vermilion et al. ........... 340/970 |
| 5,186,415 A * | 2/1993 | Li .................................. 244/12.1 |
| 5,553,812 A * | 9/1996 | Gold et al. .................. 244/76 R |
| 5,680,109 A * | 10/1997 | Lowe et al. .................. 340/608 |
| 5,893,040 A * | 4/1999 | Gunn et al. ..................... 701/15 |
| 6,181,989 B1 * | 1/2001 | Gwozdecki ....................... 701/4 |
| 6,205,376 B1 * | 3/2001 | Gordon .............................. 701/4 |
| 6,259,975 B1 * | 7/2001 | Rollet et al. ...................... 701/3 |
| 6,957,130 B1 * | 10/2005 | Horvath et al. ................... 701/3 |
| 7,158,052 B2 * | 1/2007 | Zammit-Mangion et al. ............................. 340/959 |
| 7,183,946 B2 * | 2/2007 | Boudrieau .................... 340/945 |
| 7,431,243 B1 * | 10/2008 | Allen ........................... 244/195 |
| 7,796,055 B2 * | 9/2010 | Clark et al. .................. 340/972 |
| 7,885,734 B2 * | 2/2011 | Lemoult et al. ................. 701/15 |
| 7,997,528 B2 * | 8/2011 | Lang ............................ 244/75.1 |
| 2006/0116808 A1 * | 6/2006 | Tanaka .......................... 701/102 |
| 2006/0167598 A1 * | 7/2006 | Pennarola ....................... 701/11 |
| 2007/0057114 A1 * | 3/2007 | Boissenin et al. ........... 244/75.1 |
| 2007/0180394 A1 * | 8/2007 | Hedrick ........................ 715/771 |
| 2008/0308682 A1 * | 12/2008 | Builta et al. ................. 244/182 |

\* cited by examiner

*Primary Examiner* — Thomas Black
*Assistant Examiner* — Sara Lewandroski
(74) *Attorney, Agent, or Firm* — Oblon, Spivak, McClelland, Maier & Neustadt, L.L.P.

(57) ABSTRACT

A method for controlling speed of an aircraft in the air. The method compares a variation of the aircraft speed in the air with a variation of the aircraft speed on the ground for an identical period, and detects any significant difference between the variations.

20 Claims, 2 Drawing Sheets

METHOD AND DEVICE FOR MONITORING THE SPEED OF AN AIRCRAFT

BACKGROUND OF THE INVENTION

This invention relates to a method and a device for monitoring the speed of an aircraft.

TECHNICAL FIELD

The takeoff and the landing of an aircraft are the most critical flight phases in terms of safety. The risks of accidents increase when the aircraft is close to the ground. Indeed, the margins for maneuvering are reduced and the load of the airplane is maximal at takeoff.

Certain failures can be serious and dangerous when they are not detected on the ground and they are discovered only during the takeoff. This is particularly the case when an erroneous speed of the aircraft is communicated to the pilots during the takeoff phase and they become aware thereof only at a high speed or even once the airplane is in the air.

It is essential to obtain a reliable speed value in order to pilot the aircraft correctly, particularly during critical flight phases.

The speed of the aircraft is calculated in particular from the total pressure. The total pressure is measured with the aid of specific measurement sondes, referred to as Pitot sondes. The sondes acquire the value of the total pressure and transmit it to the on-board instruments. The on-board instruments process all the data received from which certain data such as the speed of the airplane are deduced.

As it happens, the measurement of the total pressure is possible only at sufficiently high speeds (namely beyond the outset of the takeoff run): the speed of the airplane is displayed on the on-board instruments only above 30 knots. Below that, the measurements are imprecise.

Furthermore, incorrect measurements can be provided at speeds in excess thereof because of a fault in a sonde.

The Pitot sondes are easily blocked by dust, insects or any other matter foreign thereto. An error in speed measurement results therefrom. This type of error can have catastrophic consequences if it is not detected.

PRIOR ART

The document U.S. Pat. No. 6,205,376 relates to a method for monitoring the blockage of the Pitot tubes of an airplane.

According to this method, it is provided to perform the following steps:
calculating a speed of movement of the airplane, with the aid of a static Pitot system,
calculating a reference speed of movement with the aid of an independent navigation system, and
determining the existence of a blockage of the Pitot static system if the calculated speed of the airplane takes on a value beyond a predetermined tolerance scale relating to the calculated reference speed.

Another solution offered up to now to compensate for the measurement errors is to respond, as soon as the error occurs, with a procedure known as RTO ("Rejected Take Off" in English terminology), which is a special braking procedure.

The RTO procedure, however, sometimes is activated when the airplane is at full speed on the runway. There ensues an overheating of the braking system and the tires, or even a veering off the runway. The tires can be damaged in such a way that they must be replaced; the braking system must be monitored to assess the impact of the heating. Damage caused by veering off the runway is very variable and can be very extensive, or even fatal for the passengers and the crew.

One object of this invention is to offer a solution for detecting an error in measurement of the speed of the aircraft as rapidly as possible.

Another object of the invention is to provide an automatic and reliable solution for detection of an error in the speed measurement.

Another object of this invention is to make it possible to apply the said solution for speeds sufficiently low to minimize the problems created by an RTO procedure.

SUMMARY OF THE INVENTION

For this purpose, this invention proposes a method for monitoring the speed of an aircraft in the air, characterized in that it consists in comparing a variation in speed of the aircraft in the air with a variation in speed of the aircraft on the ground during an identical time period and in detecting any significant difference between the said variations.

The detection of a significant difference reveals the possibility of an erroneous speed measurement and therefore, for example, of a blocked Pitot sonde.

It will be noted that the speeds the variations of which are compared are not of the same type: indeed it is not a question of comparing variations in speed of the aircraft in the air or variations in speed of the aircraft on the ground among themselves.

According to one embodiment of the invention, a difference is regarded as significant when it exceeds a predetermined threshold S.

The method according to this invention comprises the following steps:
calculation of the variation in speed of the said aircraft in the air and the variation in speed of the said aircraft on the ground, during a predetermined time period dt;
calculation of the difference between the variation in speed in the air and the variation of speed on the ground;
comparison of the difference so calculated with the said predetermined threshold S;
detection of an anomaly when the said difference exceeds the said threshold S.

According to one embodiment of the invention, the method consists in transmitting a warning signal in the event of detection of a significant difference. The warning thus can make it possible to inform the pilots and/or any other given individual of the said detection.

The method consists in calculating the variation in speed of the said aircraft in the air and on the ground, respectively, in the following manner:
performing a first calculation of the speed of the aircraft in the air and on the ground, respectively, from a first measurement of the parameters necessary for this calculation;
performing a second calculation of the speed of the aircraft in the air and on the ground, respectively, from a second measurement made at the end of a predetermined period dt;
calculating the difference between the first and the second speed of the aircraft calculated in the air and on the ground, respectively.

The method according to this invention begins only when the calculated air speed is in excess of a predetermined start-up speed of the aircraft. Indeed, as indicated above, the measurement of the total pressure is possible only starting from a certain speed. By beginning to systematically watch the variations of air and ground speeds starting from a relatively low calculated air speed, one thus is in a position to detect an anomaly quite early during the takeoff phase, before the aircraft has gained too much speed. An early detection makes it possible to respond rapidly by initiating an RTO procedure at a speed that is not too high, which increases safety.

According to one embodiment of the invention, the method is continued with the comparison of speed variations following in the course of time as long as the calculated air speed is less than a predetermined limit speed V1. This speed V1 corresponds, for example, to the speed beyond which the pilot must take off, whatever happens. Thus, in the event of an anomaly detected before the aircraft has attained this speed, it still is possible to brake the aircraft in complete safety prior to takeoff. The failure then can be repaired before allowing takeoff of the aircraft under improved safety conditions. The method progresses in this way during the takeoff phase, a critical phase, as seen above.

According to a particular embodiment of the invention, when a significant difference is detected, the monitoring method is interrupted.

This invention also relates to a system for monitoring the speed of an aircraft in the air characterized in that it comprises at least one unit provided with a means for comparison MC of a variation in speed of the aircraft in the air with a variation in speed of the aircraft on the ground during an identical time period and means for detection of any significant difference between the said variations.

The monitoring system comprises:
- at least one sensor making it possible to measure the parameters necessary for calculation of the speeds of the aircraft on the ground and in the air;
- a calculation unit making it possible to calculate the speed of the aircraft on the ground and in the air from measurements deriving from the said sensors at a moment t and a variation in speed of the aircraft in the air and on the ground during a time period dt.

The system comprises a warning management unit connected to the said unit provided with a means for comparison for the processing of a warning associated with the detection of a significant difference.

This invention also relates to an aircraft characterized in that it comprises a system making use of the method for monitoring the speed of an aircraft.

This invention furthermore applies to a computer program that can be loaded onto a unit for processing the information comprising sequences of instructions for making use of the method briefly described above, when the program is loaded onto the unit and run thereon.

BRIEF DESCRIPTION OF THE DRAWINGS

Other objects, advantages and features of the invention will become apparent on reading of the following description of the monitoring method and device according to the invention, given by way of non-limiting example with reference to the attached drawings in which.

DETAILED DESCRIPTION OF THE INVENTION

This invention relates to a method and a system for monitoring the speed of an aircraft particularly during the takeoff phase.

Figure 1:
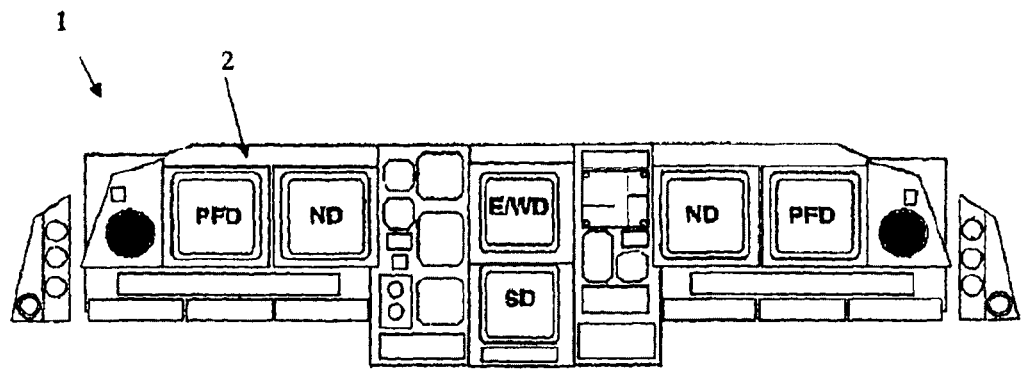
FIG. 1 shows an instrument panel of an airplane of the AIRBUS A340 (registered trademark) type.

The cockpit of an aircraft comprises instruments providing the pilots with information necessary for piloting and navigation, general information on the state of the systems, alarms and associated procedures. As shown in FIG. 1, the information is displayed on an instrument panel 1. One of the instruments on instrument panel 1 is the EFIS 2 (Electronic Flight Instruments System—set of electronic flight instruments). EFIS 2 makes it possible to display the parameters necessary for piloting and navigation.

The anemometric and inertial parameters are supplied to the EFIS system 1 by the ADIRS system (Air Data and Inertial Reference System—anemobarometric inertial reference system). The ADIRS system comprises an ADIRU (Air Data and Inertial Reference Unit—anemobarometric inertial reference unit) system. The ADIRU system supplies in particular the barometric altitude, the Mach number, the incidence, the temperature and the parameter that interests us in this invention, the true speed of the airplane in the air, hereinafter referred to as air speed. The air speed corresponds to the speed of the airplane in relation to the ground (hereinafter referred to as ground speed) from which the speed of the wind (hereinafter referred to as wind speed) is deducted:

Air speed=ground speed−wind speed

The parameters, and particularly the air speed, are calculated by an ADR (Air Data Reference—Anemometric station) module of the ADIRU system from measured data. The air speed is obtained, for example, with the aid of the air pressure which the airfoil of the aircraft is confronting (referred to as total pressure), the static pressure, the temperature of the air. The results obtained are corrected slightly with the aid of the angle of attack and the position of the flaps. The total pressure is measured by sensors of the Pitot sonde type (sonde P on FIG. 2).

Sensors of the Pitot sonde type can transmit erroneous measurements in particular, for example, when they are clogged up with any type of dirt (natural or otherwise).

This invention consists in systematically and securely detecting such erroneous measurements of air speed, particularly in the course of takeoff during which the obtaining of such information is crucial for piloting of the airplane.

Failure to detect these erroneous measurements can have unfortunate consequences during flight.

The air speed and the ground speed are parameters calculated independently of one another.

Indeed, the air speed, as seen above, is calculated in particular from the total pressure.

The ground speed, on the other hand, is calculated from the acceleration of the airplane. The acceleration of the airplane is measured with the aid of accelerometers (accelerometer A on FIG. 2). An IR (Inertial Reference—Inertial reference platform) module of the ADIRU system calculates the ground speed by integrating the measured acceleration.

The ground speed and the air speed cannot be compared directly in order to detect an inaccurate measurement. As seen above, the air speed depends on the wind (the air speed corresponds to the ground speed minus the wind speed). For an airplane that has come to a stop, subjected to a wind speed of 20 knots, the on-board instruments will indicate an air speed of 20 knots and a ground speed of 0 knots: the air speed therefore does not correspond to the ground speed.

Furthermore, the calculation of the ground speed parameter frequently proves to be erroneous by reason of the errors inherent in the integration: at the end of a flight, the error can reach 8 knots.

The method for monitoring air speed according to this invention therefore is based on the comparison of variations in air speed and in ground speed during a very short time period during which it is possible to consider the variations in wind speed, as well as the variations in altitude, to be negligible.

During this time period, it is considered that the variations in temperature of the air and in the angle of attack are themselves also negligible.

Thus:

$$\frac{d(\text{air speed})}{dt} = \frac{d(\text{ground speed})}{dt}$$

knowing that during a very short time period $$\frac{d(\text{wind speed})}{dt} \approx 0$$

The comparison of variations in speed thus makes it possible to verify the speed of the aircraft at takeoff.

During the takeoff, the speed of the aircraft increases until it reaches a speed allowing it to leave the ground. The takeoff speed varies according to the airplanes. The acceleration of the aircraft is strong at takeoff: indeed, the aircraft must reach a considerable speed during a very brief time period.

The variations in air speed at takeoff therefore are very substantial. On the other hand, the speed of the wind varies not at all or very little and the variations in the speed of the wind therefore can be considered to be negligible in relation to the variations in air or ground speed.

Figure 2:
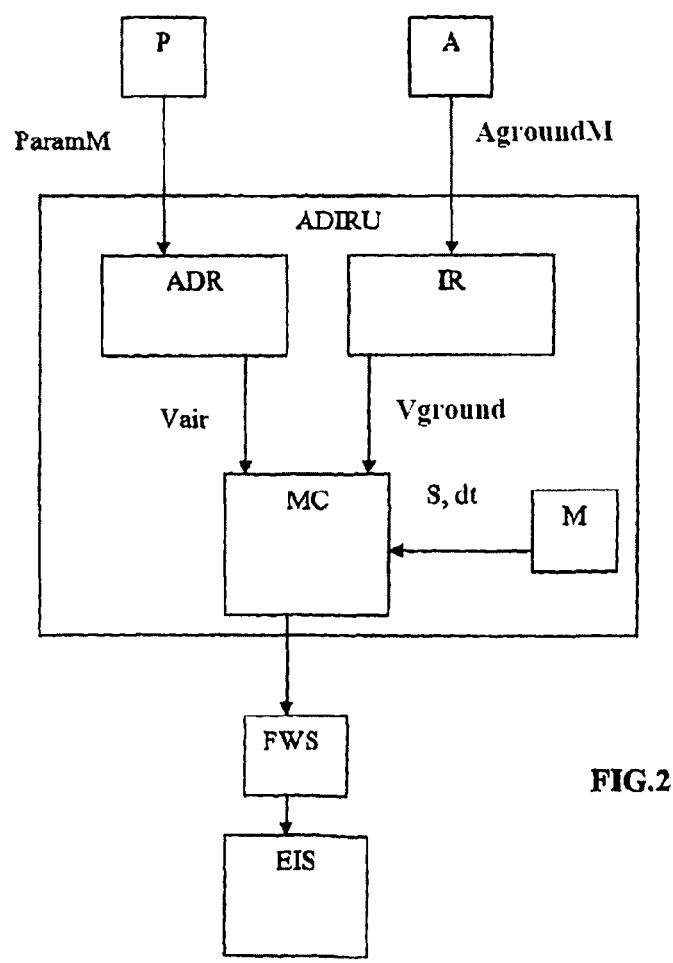
FIG. 2 schematically shows an embodiment of the monitoring device according to this invention.

FIG. 2 shows an embodiment of the monitoring device according to this invention.

The ADIRU system is an electronic unit performing monitoring of the air speed.

An electronic unit designates a system comprising at least one microprocessor connected by an internal bus to a non-volatile memory for example of the ROM, EEPROM, Flash or other type making it possible to store programs and data, a volatile memory of the RAM type, input/output means for communicating with the outside.

More precisely, the ADIRU system comprises several modules: the ADR module, the IR module and the comparison module MC. The ADR module of the ADIRU system receives, as seen above, the values of parameters ParamM such as the total pressure from which it calculates the air speed Vair. The IR module of the ADIRU system receives the values of the measured ground acceleration AgroundM and deduces the ground speed Vground therefrom.

The ADIRU system comprises a storage zone M in which there is recorded the period dt during which the variations in speed are to be determined. Zone M also stores comparison threshold S that corresponds to the minimum difference between the variations in ground speed and the variations in air speed starting from which it is considered that the value of the air speed indicated to the pilots well may be erroneous.

From the calculated air Vair and ground Vground speeds, the comparison module MC of the ADIRU system calculates the variations in speed during the period dt and performs the comparison of the difference between the variations in speed in relation to threshold S stored in zone M.

Monitoring by calculation of variations in speed and comparison of these variations can be achieved by any other system: comparison module MC could, for example, be integrated into the FWS system (Flight Warning System—System for flight warning).

In the embodiment illustrated on FIG. 2, when the module MC of the ADIRU system detects a significant difference between the speed variations, the module MC transmits a signal to the FWS system that manages the warnings. The FWS system is connected to the EIS system displaying a message to the pilots on the screen.

Any other device for display of information also may be used independently or in combination with the EIS system for display on the screen, such as a sound system, a system based on colored or other indicator lights.

Other systems could be used, such as, for example, a system bringing together the functionalities of the ADIRU, FWS and EIS system.

One of the advantages of a system such as illustrated on FIG. 2 is that it uses existing systems (ADIRU, FWS, EIS) in which only slight modifications are necessary in order to make use of the method according to this invention.

Figure 3:
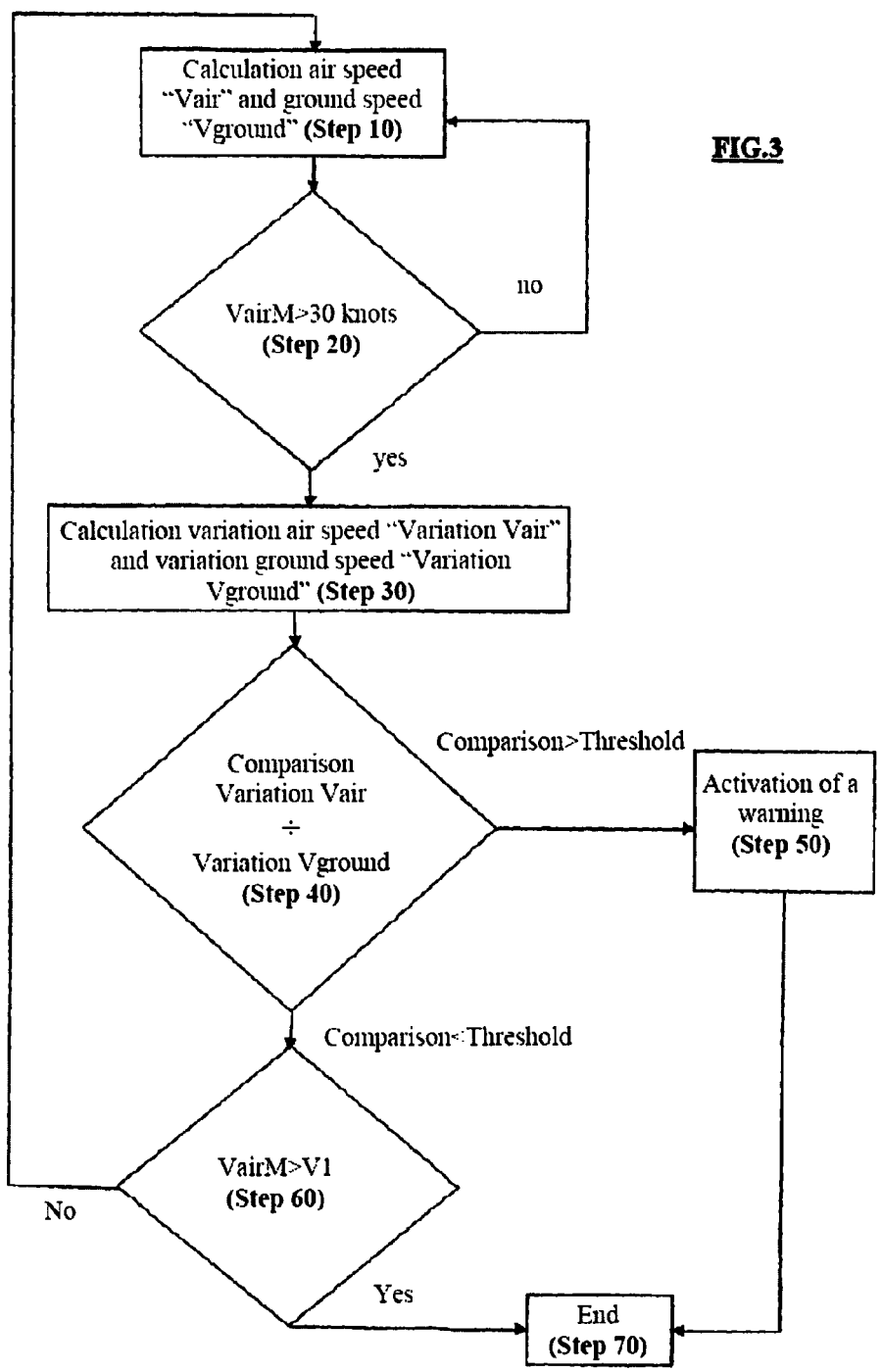
FIG. 3 schematically shows an embodiment of the monitoring method according to this invention.

As indicated on FIG. 3, the method for monitoring air speed according to this invention comprises the steps detailed below.

In a step 10, the method according to the invention calculates the air speed Vair from measured parameters such as the total pressure as seen above as well as the ground speed Vground from the measured acceleration.

The air and ground speeds, Vair and Vground, are speeds already calculated by the on-board instruments of most present-day aircraft.

According to a particular form of the method according to the invention, the said monitoring method begins only starting from a certain air speed, referred to as start-up speed (step 20). Indeed, as seen above, the measurement of the total pressure is possible only starting from a certain speed. In the illustrated example, the method is initiated when the calculated air speed Vair is in excess of 30 knots.

The method according to this invention then consists, in a step 30, in determining variations in air and ground speed over the time period dt predetermined and recorded in storage zone M: Variation Vair and Variation Vground.

According to a particular embodiment of the invention, the method consists in calculating a first air speed Vair1 from a first measurement of parameters necessary for the calculation of the air speed as well as a first ground speed Vground1 from a first measurement of acceleration. The method then consists in calculating a second air speed Vair2 from a second measurement of parameters and a second ground speed Vground2 from a second measurement of acceleration. The second measurements of parameters and acceleration are performed at the end of a time period dt after the first measurement.

The method then consists in working out the difference between the first calculated air speed Vair1 and the second calculated air speed Vair2 in order to obtain the variation in air speed:

Variation Vair=Vair1−Vair2

The method likewise consists in working out the difference between the first calculated ground speed Vground1 and the second calculated ground speed Vground2 in order to obtain the variation in ground speed:

Variation Vground=Vground1−Vground2

During a following step 40, the method compares the variation in the air speed Variation Vair and the variation in the ground speed Variation Vground. A comparison threshold S is defined and recorded in storage zone M of the system illustrated on FIG. 2. When the difference between the variation in air speed Variation Vair and the variation in ground speed Variation Vground exceeds the threshold S, the method detects a significant difference likely to correspond to an inaccurate measurement. In this case, the method comprises a step of communicating the detection to the pilots and/or to any other individual such as the ground personnel and/or to any other component making it possible to process the detection. In the embodiment illustrated, the method comprises the activation of a warning (step 50).

The threshold S and the period dt of time used for analyzing the variations are chosen on the basis of a maximum variation in speed observed during the takeoff (e.g.: maximal wind speed) so as to avoid any untimely warning, as well as on the basis of differences observed over the air speed during incidents recorded at takeoff. By way of illustration, threshold S could be 3 knots for a period dt of analysis of variations of 1 second. Obviously it is a matter of a mere example, knowing that the takeoff speed depends on the airplane: in-flight tests are necessary in order to correctly estimate the threshold S and the period dt to be recorded.

It will be noted that when an anomaly is detected and a warning signal is transmitted, the speed of the aircraft must be low enough that an RTO procedure can be initiated rapidly with complete safety, avoiding an overheating of the braking system and the tires.

The activation of a warning can be expressed in various forms.

According to a first form, a specific message to abort the takeoff is sent to the pilots. For example, the method consists in displaying to the pilots on a screen of the EIS system or on any screen provided for this purpose as seen above, a specific message such as, for example "ADR error"; "erroneous air speed." Once it is displayed, the message must remain on the screen at least until the airplane has come to a stop.

According to a second form, a sound or visual warning such as the lighting up of an indicator light of a given color can be provided.

According to other embodiments, the warning can be made up of a combination of these different means.

The activation of the warning as well as all the associated information are recorded in a file intended for a posteriori analysis of the flight.

During the activation of a warning, the method interrupts the monitoring procedure (step 70).

When the variation in speed is lower than the threshold S, the method does not detect any anomaly and performs comparison step 60 which follows.

As long as the calculated air speed VairM is lower than a predetermined so-called limit speed V1 (step 10), the method continues the monitoring (steps 10-60) and carries out the comparison of variations in air and ground speeds at later times. The sensors perform measurements regularly at predefined moments.

The method according to this invention is interrupted (step 70) when the speed VairM has exceeded the said predetermined limit speed V1 (step 60). According to a particular embodiment of the invention, the speed V1 corresponds to the speed reached by the aircraft at the end of takeoff.

When this full speed is reached, for reasons of safety the pilot has no choice other than to take off.

The invention claimed is:

1. A method for detecting an error in measurement of speed of an aircraft moving on the ground, the method comprising:
  comparing a variation in air speed of the aircraft over a predetermined period of time, as derived from measured parameters associated with the aircraft moving on the ground, to a variation in ground speed of the aircraft over the predetermined period of time sensed while the aircraft moves on the ground; and
  detecting the error in measurement of speed of the aircraft by determining that a difference between the variations in the air speed of the aircraft and the ground speed of the aircraft exceeds a predetermined threshold,
  wherein the predetermined period of time is of a value such that wind speed variation is neglected from calculations to obtain the variations in the air speed and ground speed of the aircraft associated with the aircraft moving on the ground.

2. A method according to claim 1, further comprising:
  calculating the variation in air speed of the aircraft and the variation in ground speed of the aircraft based on the predetermined period of time;
  calculating the difference between the variation in air speed and the variation in ground speed;
  comparing the difference calculated with the predetermined threshold; and
  determining that the error exists when the difference calculated exceeds the predetermined threshold.

3. A method according to claim 1, further comprising transmitting a warning signal responsive to the difference between the variations in the air speed of the aircraft and the ground speed of the aircraft exceeding the predetermined threshold.

4. A method according to claim 1, further comprising:
  calculating the variation in air speed of the aircraft and the variation in ground speed of the aircraft, respectively, by:
    performing a first calculation of the air speed of the aircraft and a first calculation of the ground speed of the aircraft from a first measurement of parameters necessary for the calculation of the air speed and ground speed of the aircraft;
    performing a second calculation Of the air speed of the aircraft and a second calculation of the ground speed of the aircraft from a second measurement made at an end of the predetermined period of time;
    calculating a difference between the first and the second air speeds of the aircraft; and
    calculating a difference between the first and second ground speeds of the aircraft.

5. A method according to claim 4, wherein the first calculation of the air speed of the aircraft is based on data from a Pitot sonde sensor.

6. A method according to claim 5, wherein the second calculation of the air speed of the aircraft is based on second data from the Pitot sonde sensor.

7. A method according to claim 4, wherein the first calculation of the ground speed of the aircraft is based on data from an acceleration sensor.

8. A method according to claim 7, wherein the second calculation of the ground speed of the aircraft is based on second data from the acceleration sensor.

9. A method according to claim 1, wherein said comparing and said detecting are performed only when a calculated air speed is in excess of a predetermined start-up speed.

10. A method according to claim 1, further comprising continuing comparison of the variations in air and ground speeds as long as a calculated air speed is lower than a predetermined limit speed.

11. A method according to claim 10, wherein the predetermined limit speed is a takeoff speed of the aircraft.

12. An aircraft, comprising a system making use of the method for monitoring the speed of an aircraft according to claim 1.

13. A method according to claim 1, wherein the method starts only when a calculated air speed is in excess of 30 knots.

14. A method according to claim 1, wherein the predetermined period of time is one second.

15. A method according to claim 1, wherein the predetermined period of time is such that altitude variations, temperature variations, and angle of attack variations can be neglected from the calculations of the variations in the air speed and ground speed of the aircraft associated with the aircraft moving on the ground.

16. A method according to claim 1, further comprising continuously detecting whether the error exists based on continuously determining differences for successive periods of the predetermined period of time so long as a speed of the aircraft does not exceed a speed threshold, below which a predetermined rejected take off (RTO) procedure is implementable.

17. A method for detecting an error in measurement of speed of an aircraft when the aircraft is moving on the ground, the method comprising:
    comparing a variation in air speed Of the aircraft over a predetermined period of time, as derived from measured parameters associated with the aircraft moving on the ground, to a variation in ground speed of the aircraft over the predetermined period of time sensed while the aircraft moves on the ground,
    wherein calculating the variation in air speed of the aircraft and the variation in ground speed of the aircraft, respectively, is performed by:
        performing a first calculation of the air speed of the aircraft from a first measured total pressure value measured by a sensor, and performing a first calculation of the ground speed of the aircraft, both of the first calculations being performed at a first measurement time,
        performing a second calculation of the air speed of the aircraft from a second measured total pressure value measured by the sensor, and performing a second calculation of the ground speed of the aircraft from a second measurement made at an end of a predetermined period after the first measurement time,
        calculating a difference between the first and the second air speeds of the aircraft, and
        calculating a difference between the first and second ground speeds of the aircraft; and
    detecting the error in measurement of speed of the aircraft by determining that a difference between the variations in the air speed of the aircraft and the ground speed of the aircraft exceeds a predetermined threshold,
    wherein the predetermined period after the first measurement time is of a value such that wind speed variation can be neglected from calculations to obtain the variations in the air speed and ground speed of the aircraft associated with the aircraft moving on the ground.

18. A system for detecting an error in measurement of speed of an aircraft moving on the ground, the system comprising:
    comparison circuitry configured to compare a variation in air speed of the aircraft over a predetermined period of time, as derived from measured parameters associated with the aircraft moving on the ground, to a variation in ground speed of the aircraft over the predetermined period of time sensed while the aircraft moves on the ground; and
    detecting circuitry configured to detect the error in measurement of speed of the aircraft by determining that a difference between the variations in the air speed of the aircraft and ground speed of the aircraft exceeds a predetermined threshold,
    wherein the predetermined period of time is of a value such that wind speed variation can be neglected from calculations to obtain the variations in the air speed and ground speed of the aircraft associated with the aircraft moving on the ground.

19. A system according to claim 18, further comprising warning management circuitry connected to the comparison circuitry and configured to process a warning responsive to the difference between the variations in the air speed of the aircraft and the ground speed of the aircraft exceeding the predetermined threshold.

20. A system for detecting an error in measurement of speed of an aircraft when the aircraft is moving on the ground, the system comprising:
    comparison circuitry configured to compare a variation in air speed of the aircraft over a predetermined period of time, as derived from measured parameters associated with the aircraft moving on the ground, to a variation in ground speed of the aircraft over the predetermined period of time sensed while the aircraft moves on the ground; and,
    wherein calculating the variation in air speed of the aircraft and the variation in ground speed of the aircraft, respectively, is performed by:
    calculation circuitry configured to:
        perform a first calculation of the air speed of the aircraft from a first measured total pressure value measured by a sensor, and perform a first calculation of the ground speed of the aircraft, both of the first calculations being performed at a first measurement time,
        perform a second calculation of the air speed of the aircraft from a second measured total pressure value measured by the sensor, and perform a second calculation of the ground speed of the aircraft from a second measurement made at an end of a predetermined period after the first measurement time,
        calculate a difference between the first and the second air speeds of the aircraft, and
        calculate a difference between the first and second ground speeds of the aircraft; and
    detection circuitry configured to detect the error in measurement of speed of the aircraft by determining that a difference between the variations in the air speed of the aircraft and the ground speed of the aircraft exceeds a predetermined threshold,
    wherein the predetermined period after the first measurement time is of a value such that wind speed variation can be neglected from calculations to obtain the variations in the air speed and ground speed of the aircraft associated with the aircraft moving on the ground.

* * * * *